United States Patent
Mori et al.

(10) Patent No.: US 9,434,217 B2
(45) Date of Patent: Sep. 6, 2016

(54) WHEEL POSITION DETECTION APPARATUS AND TIRE AIR PRESSURE DETECTION APPARATUS HAVING THE SAME

(71) Applicants: DENSO CORPORATION, Kariya, Aichi-pref. (JP); PACIFIC INDUSTRIAL CO., LTD., Ogaki-shi, Gifu (JP)

(72) Inventors: Masashi Mori, Obu (JP); Takatoshi Sekizawa, Kariya (JP); Yoshinori Hayashi, Gifu (JP); Takao Araya, Mizuho (JP)

(73) Assignees: DENSO CORPORATION, Kariya, Aichi-pref. (JP); PACIFIC INDUSTRIAL CO., LTD., Ogaki-shi (JP)

( * ) Notice: Subject to any disclaimer, the term of this patent is extended or adjusted under 35 U.S.C. 154(b) by 62 days.

(21) Appl. No.: 14/419,767

(22) PCT Filed: Aug. 1, 2013

(86) PCT No.: PCT/JP2013/004661
§ 371 (c)(1),
(2) Date: Feb. 5, 2015

(87) PCT Pub. No.: WO2014/024436
PCT Pub. Date: Feb. 13, 2014

(65) Prior Publication Data
US 2015/0191056 A1 Jul. 9, 2015

(30) Foreign Application Priority Data
Aug. 6, 2012 (JP) .................................. 2012-174138

(51) Int. Cl.
| | |
|---|---|
| G01L 17/00 | (2006.01) |
| B60C 23/04 | (2006.01) |
| G01M 17/013 | (2006.01) |
| G01V 7/04 | (2006.01) |

(52) U.S. Cl.
CPC ....... *B60C 23/0489* (2013.01); *B60C 23/0416* (2013.01); *B60C 23/0488* (2013.01); *G01M 17/013* (2013.01); *G01V 7/04* (2013.01); *G01L 17/00* (2013.01)

(58) Field of Classification Search
None
See application file for complete search history.

(56) References Cited

U.S. PATENT DOCUMENTS 4,651,290 A  3/1987  Masaki et al.
6,112,587 A  9/2000  Oldenettel
(Continued)

FOREIGN PATENT DOCUMENTS

EP  0795448 A2  9/1997
JP  S60596 A  1/1985
(Continued)

OTHER PUBLICATIONS

Office Action dated Jun. 30, 2015 in corresponding JP Application No. 2012-174138.
(Continued)

*Primary Examiner* — Robert R Raevis
(74) *Attorney, Agent, or Firm* — Harness, Dickey & Pierce, P.L.C.

(57) ABSTRACT

In a wheel position detection apparatus, a first controlling section of a transmitter repeatedly transmits a frame including specific identification information at a timing when an angle of the transmitter is at a predetermined angle. A second control unit of a receiver receives the frame transmitted from the transmitter, and identifies which of a plurality of wheels the transmitter that has transmitted the frame is attached to. The receiver changes an allowable range of variability in accordance with a road surface condition indicated by a degree of road surface roughness every time the frame is received, and sets the allowable range of variability wider for a road surface that is rough than for a road surface that is not rough.

4 Claims, 10 Drawing Sheets

(56) References Cited

U.S. PATENT DOCUMENTS

2006/0250228 A1 11/2006 Mori et al.
2012/0112899 A1 5/2012 Hannon
2012/0259507 A1 10/2012 Fink

FOREIGN PATENT DOCUMENTS

| JP | H09243345 A | 9/1997 |
|----|----|----|
| JP | H10048233 A | 2/1998 |
| JP | 2005238928 A | 9/2005 |
| JP | 2006312342 A | 11/2006 |
| JP | 2010122023 A | 6/2010 |
| JP | 2012096640 A | 5/2012 |
| WO | WO2011/085877 | 7/2011 |

OTHER PUBLICATIONS

International Search Report and Written Opinion (in Japanese with English Translation) for PCT/JP2013/004661, mailed Oct. 8, 2013; ISA/JP.

FIRST RECEPTION

SECOND RECEPTION

THIRD RECEPTION

| RECEPTION | TIME (t) | TOOTH POSITION AT THE TIME OF RECEPTION (0–95) | | | | WHEEL POSITION SPECIFYING LOGIC (TRUE or FALSE) | | | |
|---|---|---|---|---|---|---|---|---|---|
| | | FL | FR | RL | RR | FL | FR | RL | RR |
| RECEPTION1 | 0.0 | 68 | 92 | 62 | 78 | – | – | – | – |
| RECEPTION2 | 5.1 | 56 | 42 | 38 | 8 | TRUE | FALSE | TRUE | FALSE |
| RECEPTION3 | 10.3 | 72 | 26 | 42 | 72 | TRUE | | TRUE | |
| RECEPTION4 | 14.3 | 60 | 62 | 22 | 6 | TRUE | | FALSE | |

| RECEPTION | TIME (t) | TOOTH POSITION AT THE TIME OF RECEPTION (0–95) | | | | WHEEL POSITION SPECIFYING LOGIC (TRUE or FALSE) | | | |
|---|---|---|---|---|---|---|---|---|---|
| | | FL | FR | RL | RR | FL | FR | RL | RR |
| RECEPTION1 | 0.0 | 38 | 68 | 30 | 50 | – | – | – | – |
| RECEPTION2 | 4.1 | 2 | 78 | 80 | 46 | FALSE | TRUE | FALSE | TRUE |
| RECEPTION3 | 8.3 | 42 | 74 | 14 | 28 | | TRUE | | TRUE |
| RECEPTION4 | 12.4 | 88 | 78 | 52 | 22 | | TRUE | | FALSE |

| RECEPTION | TIME (t) | TOOTH POSITION AT THE TIME OF RECEPTION (0–95) | | | | WHEEL POSITION SPECIFYING LOGIC (TRUE or FALSE) | | | |
|---|---|---|---|---|---|---|---|---|---|
| | | FL | FR | RL | RR | FL | FR | RL | RR |
| RECEPTION1 | 0.0 | 62 | 94 | 54 | 76 | – | – | – | – |
| RECEPTION2 | 4.5 | 80 | 66 | 60 | 32 | TRUE | FALSE | TRUE | FALSE |
| RECEPTION3 | 9.0 | 92 | 40 | 64 | 88 | FALSE | | TRUE | |

| RECEPTION | TIME (t) | TOOTH POSITION AT THE TIME OF RECEPTION (0–95) | | | | WHEEL POSITION SPECIFYING LOGIC (TRUE or FALSE) | | | |
|---|---|---|---|---|---|---|---|---|---|
| | | FL | FR | RL | RR | FL | FR | RL | RR |
| RECEPTION1 | 0.0 | 36 | 86 | 24 | 62 | – | – | – | – |
| RECEPTION2 | 4.5 | 0 | 6 | 74 | 64 | FALSE | TRUE | FALSE | TRUE |
| RECEPTION3 | 8.6 | 62 | 24 | 30 | 70 | | FALSE | | TRUE |

FIG. 10
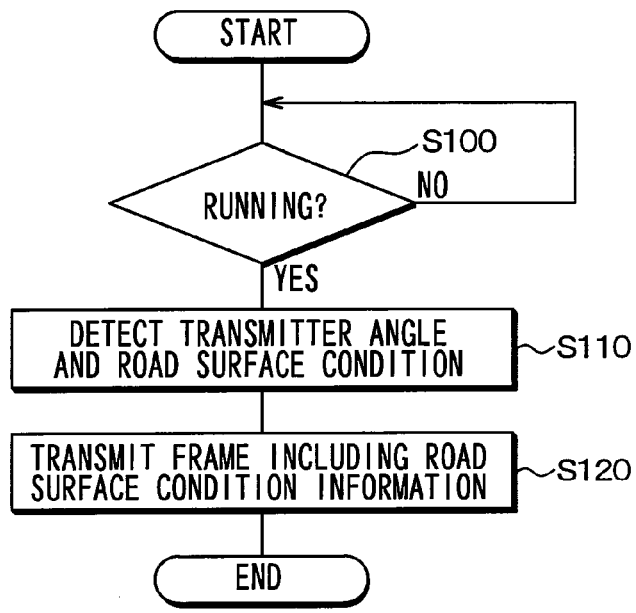
FIG. 11
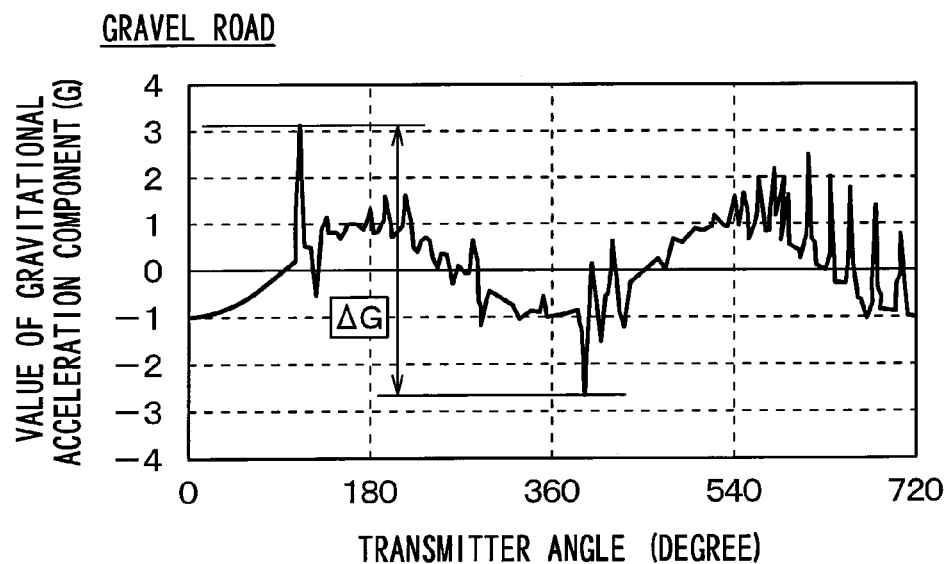
FIG. 12
| SYNCHRONIZATION | ID INFORMATION | PRESSURE | TEMPERATURE | ANGULAR ACCURACY INFORMATION |
|---|---|---|---|---|

WHEEL POSITION DETECTION APPARATUS AND TIRE AIR PRESSURE DETECTION APPARATUS HAVING THE SAME

CROSS REFERENCE TO RELATED APPLICATIONS

This application is a U.S. National Phase Application under 35 U.S.C. 371 of International Application No. PCT/JP2013/004661 filed on Aug. 1, 2013 and published in Japanese as WO 2014/024436 on Feb. 13, 2014. The present disclosure is based on and claims the benefit of priority from Japanese Patent Application No. 2012-174138 filed on Aug. 6, 2012. The entire disclosures of all of the above applications are incorporated herein by reference.

TECHNICAL FIELD

The present disclosure relates to a wheel position detection apparatus that detects in which position of a vehicle a wheel to be detected is mounted, and a tire air pressure detection apparatus provided with the wheel position detection apparatus.

BACKGROUND ART

Conventionally, as one of tire air pressure detection apparatus, there has been a direct-type apparatus. In this type of the tire air pressure detection apparatus, transmitters provided with sensors such as pressure sensors are directly attached on the side of wheels to which tires are attached. In addition, an antenna and a receiver are provided on the side of a vehicle body. When a detection signal from the sensor is transmitted from the transmitter, the detection signal is received by the receiver through the antenna, and thus detection of the tire pressure is performed.

In such a direct-type tire air pressure detection apparatus, it needs to be determined whether the transmitted data is for the subject vehicle, and which wheel the transmitter that transmits the data is attached on. Therefore, pieces of ID information, for determining whether the data is for the subject vehicle or for the other vehicles, and for determining the wheel to which the transmitter is attached on, are given to the data transmitted from the corresponding transmitters.

In addition, in order to specify a position of the transmitter from the ID information included in the transmission data, the ID information of the transmitters needs to be registered in advance in the side of the receivers in association with the corresponding positions of the wheels. Therefore, at the time of tire rotation, relationships between the ID information of the transmitters and the positions of the wheels need to be reregistered to the receivers. Technologies that allow this registering to be automatically carried out have been proposed.

Specifically, in an apparatus described in Patent Literature 1, based on an acceleration detecting signal of an acceleration sensor provided in a transmitter on the wheel side, a wheel being set at a predetermined rotational position is detected, and the rotational position of the wheel at the time of receiving a radio signal from the transmitter is detected even on the vehicle body side. And the wheel position is specified by monitoring changes of a relative angle of these. In this method, a change of the relative angle of the rotational positions of the wheels detected on the wheel side and on the vehicle body side is monitored based on deviations of the predetermined number of data. By determining that the variability exceeds an allowable value in relation to an initial value, the wheel position is specified.

CITATION LIST

Patent Literature

Patent Literature 1: JP-A-2010-122023

SUMMARY OF INVENTION

Technical Problem

However, when the wheel position detection is carried out in such a manner as described in Patent Literature 1, detection accuracy of the rotational position, based on the acceleration detection signal, varies depending on a road surface condition. For example, the accuracy becomes higher for a road surface that is not rough, such as a paved road, but the accuracy is deteriorated for a road surface that is rough, such as a gravel road. In response to this, when allowance values of variability to be used in estimation is set to be narrower in accordance with the road surface that is not rough at the time of carrying out the wheel position detection by the receiver on the vehicle body side, the wheel position detection cannot be carried out at the time of running on the road surface that is rough. On the contrary, when set wider in accordance with the road surface that is rough, there may be a concern in that the wheel position detection for the road surface that is not rough takes a longer time.

In view of the above, it is an object of the present disclosure to provide a wheel position detection apparatus that is capable of carrying out a fast wheel position detection for the road surface that is not rough and an adequate wheel position detection for a road surface that is rough, and a tire air pressure detection apparatus provided with the wheel position detection apparatus.

Solution to Problem

A wheel position detection apparatus according to one aspect of the present disclosure is applied to a vehicle in which a plurality of wheels provided with tires are attached to a vehicle body, and includes transmitters and a receiver. Each of the transmitters is provided in a corresponding one of the plurality of the wheels, and has a first controlling section that produces and transmits a frame including specific identification information. The receiver is provided in the vehicle body and has a second controlling section. The second controlling section receives the frame transmitted from each of the transmitter through a reception antenna and carries out a wheel position detection to specify which wheel the transmitter that has transmitted the frame is provided in, and to store the plurality of the wheels in association with the identification information of the transmitters provided in the plurality of the wheels, respectively.

Each of the transmitters includes an acceleration sensor that outputs a detection signal depending on the acceleration including a gravitational acceleration component that varies in connection with rotation of the wheels in which the corresponding transmitters are provided.

Each of the first controlling sections detects an angle of the corresponding one of the transmitters in accordance with the gravitational acceleration component included in the detection signal of the corresponding one of the acceleration sensors, with a central axis of the corresponding one of the wheels, to which the transmitters are attached, set as a center and with an arbitrary position along a circumferential direction set as zero degree, and transmits the frame repeatedly at a timing when the angle becomes a predetermined angle.

The second controlling section acquires gear information indicating a tooth positions of gears in accordance with detection signals of wheel speed sensors that output the detection signals depending on transits of teeth of the gears that are rotated in connection with the plurality of the wheels, and sets an allowable range of variability in accordance with the tooth position at the reception timing of the frame. When the tooth position at the reception timing of the frame after the allowable range of variability is set is beyond the allowable range of variability, the corresponding one of the wheels is eliminated from candidates of the wheel to which the transmitter that has transmitted the frame is attached, and the remaining of the wheels is registered as a wheel to which the transmitter that has transmitted the frame is attached.

The second controlling section changes the allowable range of variability depending on a road surface condition indicated by roughness of a road surface every time the frame is received, so that the allowable range of variability is set wider for a road surface that is rough than for a road surface that is not rough.

In the wheel position detection apparatus, the allowable range of variability at the time of carrying out the wheel position detection is set depending on the road surface condition. Specifically, the allowable range of variability is set narrower for a road surface that is not rough, and the allowable range of variability is set wider for a road surface that is rough. With this, because the wheel position detection can be carried out with the narrower allowable range of variability at the time of running on the road surface that is not rough, so that the wheel position detection can be carried out faster. In addition, by carrying out the wheel position detection with the wider allowable range of variability at the time of running on the road surface that is rough, so that the wheel position detection can be adequately carried out even on the road surface that is rough.

A tire air pressure detection apparatus according to another aspect of the present disclosure includes the wheel position detection apparatus. Each of the transmitters includes a sensing section that outputs a detection signal depending on a pressure of the tire provided in each of the plurality of the wheels, and transmits a frame to the receiver after storing in the frame information regarding the pressure of the tire for which the detection signal from the sensing section is signal-processed by the first controlling section. The receiver detects the pressure of the tire provided in the plurality of the wheels from the information regarding the pressure of the tire in the second controlling section.

BRIEF DESCRIPTION OF DRAWINGS

The above and other objects, features and advantages of the present disclosure will become more apparent from the following detailed description made with reference to the accompanying drawings. In the drawings:

FIG. 7A is a view illustrating an evaluation result of a wheel position in a frame including ID1 as identification information;

FIG. 7B is a view illustrating an evaluation result of a wheel position in a frame including ID2 as identification information;

FIG. 7C is a view illustrating an evaluation result of a wheel position in a frame including ID3 as identification information;

FIG. 7D is a view illustrating an evaluation result of a wheel position in a frame including ID4 as identification information;

FIG. 10 is a flowchart illustrating a data transmission process carried out by the transmitter;

FIG. 11 is a waveform diagram illustrating a state when a gravitational component superposed with noises is extracted from the detection signal obtained on the gravel road; and FIG. 12 is a view illustrating one example of a frame configuration.

EMBODIMENTS FOR CARRYING OUT INVENTION

In the following, embodiments of the present disclosure will be explained based on the drawings. Incidentally, the explanation is made with the same reference symbols given to the same or equivalent portions throughout the following embodiments.

First Embodiment

A first embodiment of the present disclosure is explained with reference to the drawings. First, an entire configuration of a tire air pressure detection apparatus, to which a wheel position detection apparatus according to a first embodiment of the present disclosure is applied, is explained with reference to FIG. 1. Incidentally, an upward direction in the paper of FIG. 1 corresponds with a front side of a vehicle 1, and a downward direction corresponds with a rear side of the vehicle 1.

Figure 1:
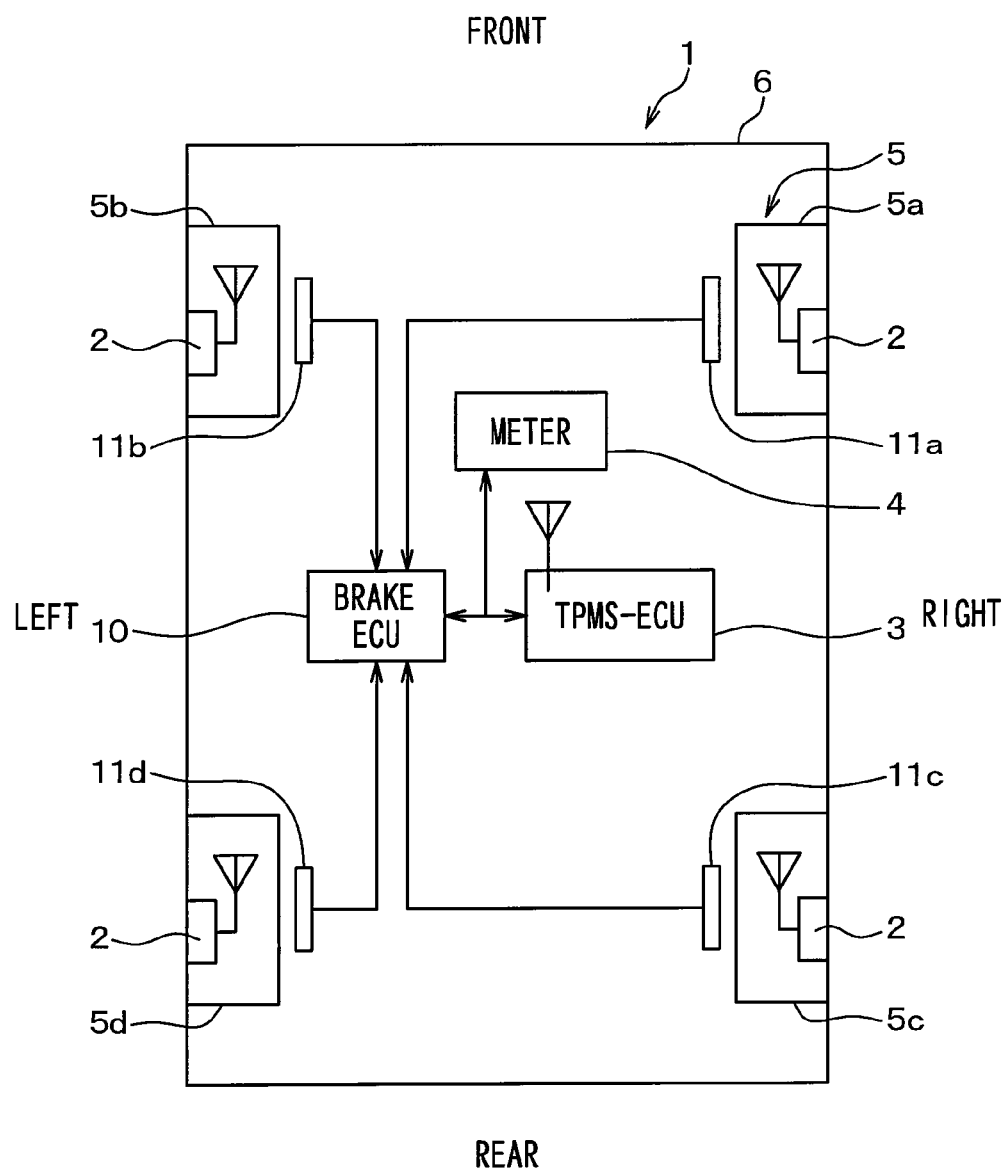
FIG. 1 is a view illustrating an entire configuration of a tire air pressure detection apparatus to which a wheel position detection apparatus according to a first embodiment of the present disclosure is applied.

As illustrated in FIG. 1, the tire air pressure detection apparatus, which is attached in the vehicle 1, is configured to have transmitters 2, an ECU 3 for the tire air pressure detection apparatus (referred to as TPMS-ECU, hereinafter) that plays a role as a receiver, and a meter 4. The wheel position detection apparatus specifies a wheel position by using the transmitters 2 and the TPMS-ECU 3, which are provided in the tire air pressure detection apparatus, and acquiring from an ECU 10 for brake controlling (referred to as a brake ECU, hereinafter) gear information obtained from detection signals of wheel speed sensors 11a-11d provided in corresponding wheels 5 (5a-5d).

As illustrated in FIG. 1, the transmitters 2, which are attached to the corresponding wheels 5a-5d, detect pressures of tires attached to the corresponding wheels 5a-5d, store information regarding the tire pressures that indicate the detection results into a frame, and transmit the frame. The TPMS-ECU 3, which is attached on the side of a vehicle body 6 in a vehicle 1, receives the frame transmitted from the transmitters 2 and carries out various processes, calculations, or the like in accordance with the receiving timing and the detection signal stored in the frame, thereby to carry out the wheel position detection and the tire pressure monitoring. The transmitters 2 produce the frame in accordance with, for example, frequency-shift keying (FSK), and the TPMS-ECU 3 reads the data within the frame by demodulating the frame, thereby to carry out the wheel position detection and the tire pressure monitoring. Detailed configurations of the transmitters 2 and the TPMS-ECU 3 are explained with reference to FIG. 2A and FIG. 2B, respectively.

Figure 2A:
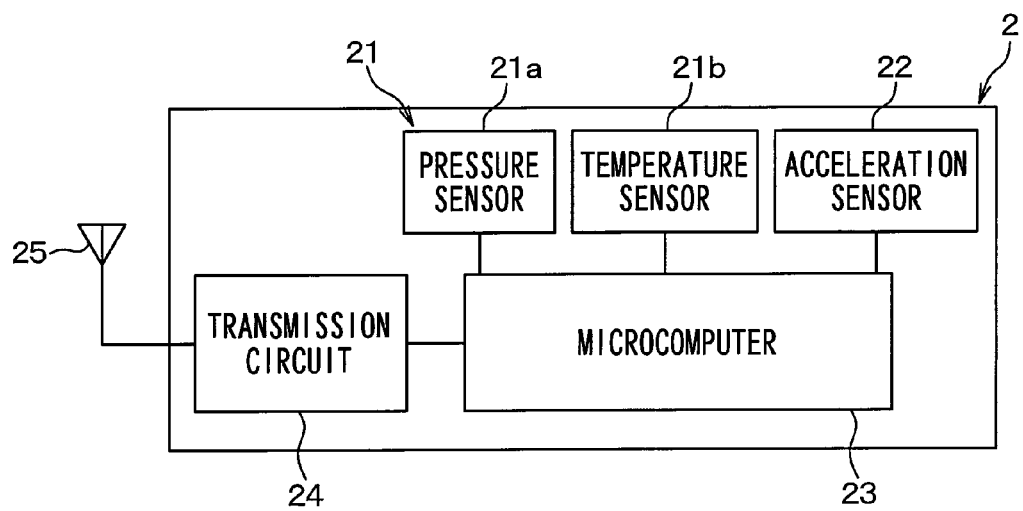
FIG. 2A is a block diagram illustrating a configuration of a transmitter.

As illustrated in FIG. 2A, the transmitter 2 is configured to have a sensing section 21, an acceleration sensor 22, a microcomputer 23, a transmission circuit 24, and a transmission antenna 25. Each section operates on electric power from an unillustrated battery.

The sensing section 21, which is configured to have a diaphragm-type pressure sensor 21a and a temperature sensor 21b, outputs a detection signal depending on the tire pressure and a detection signal depending on a temperature. The acceleration sensor 22 is used to carry out the positional detection of the sensor in the corresponding wheels 5a-5d to which the transmitters 2 are attached, namely, a vehicle speed detection and the position detection for the transmitter 2. For example, the acceleration sensor 22 of the present embodiment outputs the detection signal depending on acceleration in a radius direction of each of the wheels 5a-5d, namely, acceleration in both directions perpendicular to the circumferential direction, among acceleration applied to the wheels 5a-5d when the wheels 5a-5d are rotating.

The microcomputer 23, which is a known one that is provided with a controlling section (a first controlling section), carries out predetermined processes in accordance with programs stored in a memory within the controlling section. The memory within the controlling section stores individual ID information including identification information, which is specific to and specifies the subject vehicle, and identification information, which is specific to and specifies the corresponding transmitters 2.

The microcomputer 23 receives the detection signal regarding the tire pressure from the sensing section 21, and carries out signal processing on the detection signal and processes when necessary. The microcomputer 23 stores the information regarding the tire pressure and the ID information of each of the transmitters 2 in the frame. In addition, the microcomputer 23 monitors the detection signal of the acceleration sensor 22, and carries out a vehicle speed detection and a position detection of the transmitter 2 in the wheels 5a-5d to which the corresponding transmitters 2 are attached. Moreover, when the frame is produced, the microcomputer 23 carries out frame transmission (data transmission) toward the TPMS-ECU 3 from the transmission antenna 25 through the transmission circuit 24, in accordance with results of the vehicle speed detection and the position detection of the transmitter 2.

Specifically, the microcomputer 23 starts the frame transmission under a condition that the vehicle 1 is running, and repeatedly carries out the frame transmission when a predetermined transmission timing comes. For example, the microcomputer 23 carries out the frame transmission at the timing when an angle of the transmitter 2 to which the acceleration sensor 22 is attached becomes a predetermined transmission angle, in accordance with the detection signal of the acceleration sensor 22. Moreover, the microcomputer 23 repeatedly carries out the frame transmission at the timing when the angle of the transmitter 2 becomes the predetermined transmission angle.

It is determined that the vehicle is running, based on the result of the vehicle speed detection. The angle of the transmitter 2 is determined based on the result of the position detection of the transmitter 2 in accordance with the detection signal of the acceleration sensor 22. Namely, the vehicle speed detection is carried out in the microcomputer 23 by using the detection signal of the acceleration sensor 22. When the vehicle speed becomes a predetermined speed (for example, 5 km/h) or greater, it is determined that the vehicle 1 is running. An output of the acceleration sensor 22 includes an acceleration (a centrifugal acceleration) based on a centrifugal force. By integrating the centrifugal acceleration and multiplying the result by a coefficient, the vehicle speed can be calculated.

Figure 3A:
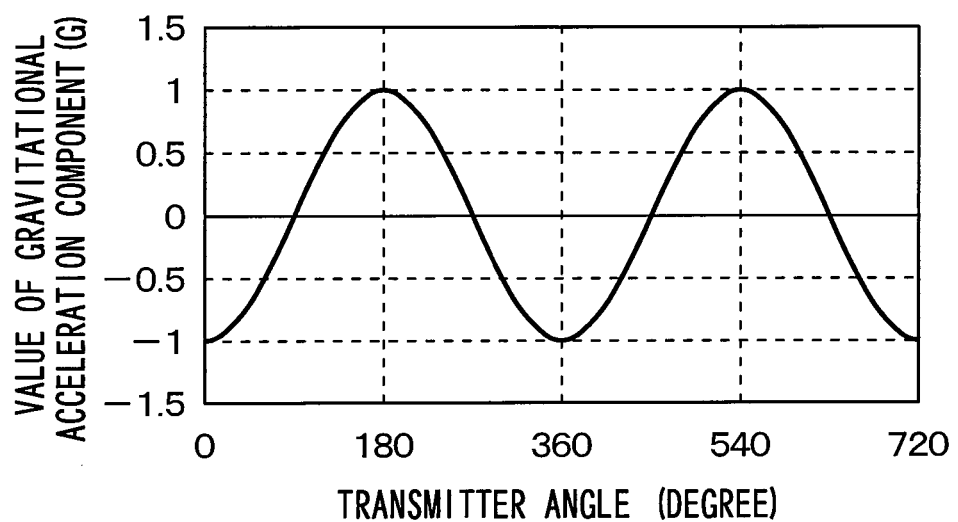
FIG. 3A is a view illustrating a relationship between a transmitter angle and a value of a gravitational acceleration component.
Figure 3B:
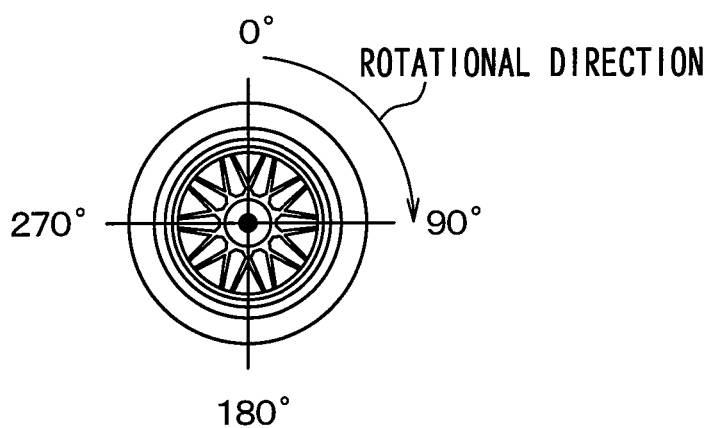
FIG. 3B is a view illustrating the transmitter angle in each wheel.
Figure 4:
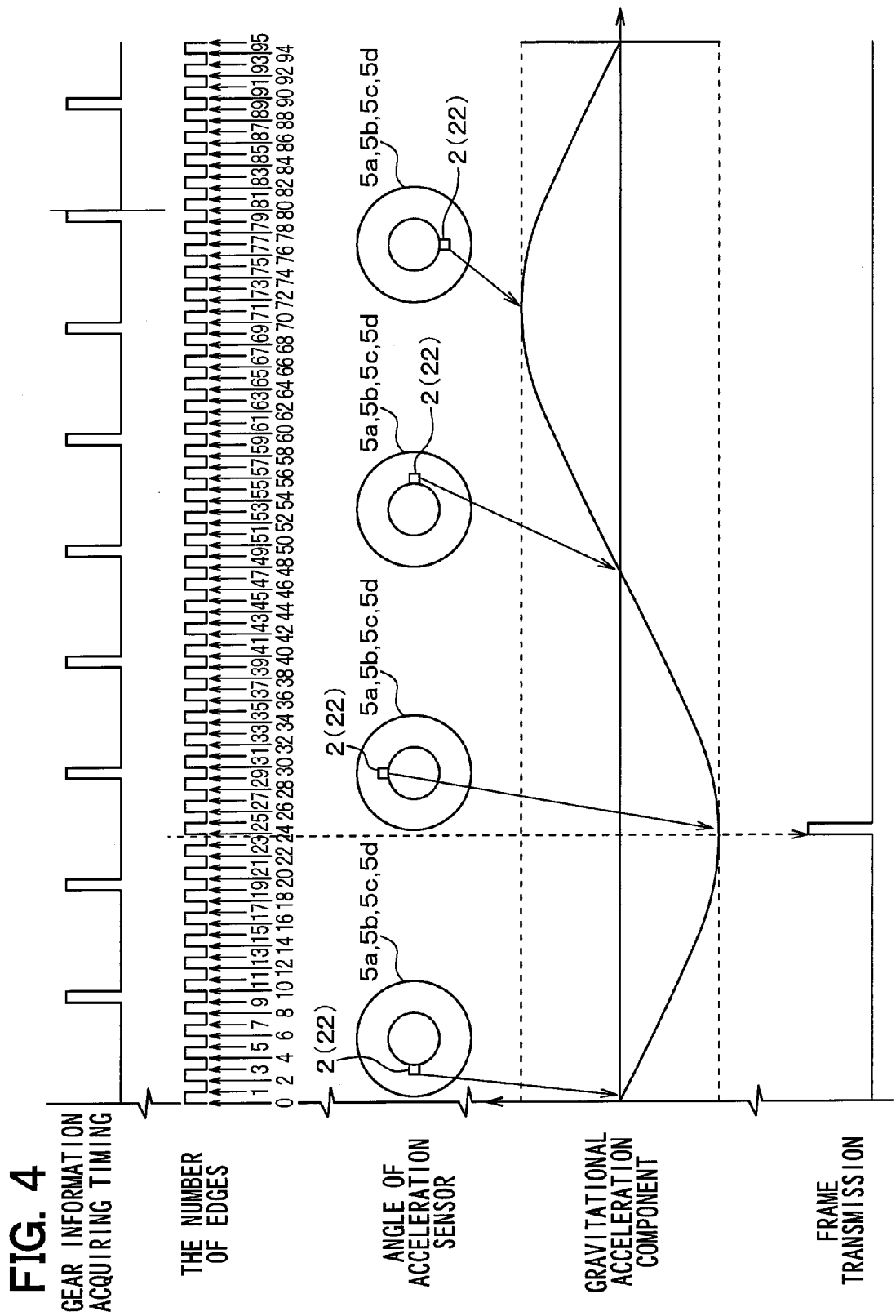
FIG. 4 is a timing chart for explaining a wheel position detection.

In addition, because the detection signals depending on rotation of the corresponding wheels 5a-5d are output by the acceleration sensor 22, the detection signal includes the gravitational acceleration component, which results in a signal having an amplitude depending on wheel rotation, at the time of running. For example, an amplitude of the detection signal takes the negative maximum amplitude when the transmitter 2 is located in an upper position, zero when the transmitter 2 is located in a horizontal position, and the positive maximum amplitude when the transmitter 2 is located in a lower position, centering a central axis of the wheels 5a-5d, as illustrated in FIG. 3A. Therefore, the position detection of the transmitter 2 to which the acceleration sensor 22 is attached can be carried out based on the amplitude, and the angle of the transmitter 2 can be detected. For example, the angle of the transmitter 2 can be perceived as an angle from zero degree, which is defined when the transmitter 2 is located in the upper position, centering the central axis of each of the wheels 5a-5d, as illustrated in FIG. 3B. And as illustrated in FIG. 3A, the angle of the transmitter 2 and the value of the gravitational acceleration component are associated with each other, and therefore the angle of the transmitter 2 can be detected based on the value of the gravitation acceleration component.

Therefore, the frame transmission can be carried out from the each of the transmitters 2 at an initiation timing, which is set to be the same time as when a vehicle speed reaches a predetermined vehicle speed, or the time when the angle of the transmitter 2 becomes a predetermined transmission angle after a vehicle speed reaches the predetermined vehicle speed. Then, the frame transmission can be repeatedly carried out at the timing when the angle of the transmitter 2 becomes the transmission angle. Incidentally, while the transmission timing may be set for every one cycle of the amplitude cycle of the value of the gravitational acceleration component, the frame transmission may preferably be carried out, for example, at a rate of once in a predetermined period of time (for example, 15 seconds), taking a battery life into consideration, without always carrying out the frame transmission for every cycle. The transmission circuit 24 serves as an output section that transmits the frame, which is sent from the microcomputer 23, toward the TPMS-ECU 3 through the transmission antenna 25. Radio waves, for example, in an RF band is used for the frame transmission.

The transmitter 2 configured in such a manner is attached, for example, to an air inlet valve in each of the wheels 5a-5d and disposed so that the sensing section 21 is exposed toward the inner side of the tire. When the corresponding tire pressure is detected and the vehicle speed exceeds a predetermined speed, as described above, the transmitter 2 repeatedly carries out the frame transmission through the transmission antenna 25 provided in the transmitter 2 at the transmission timing. The frame transmission may be carried out at the transmission timing set as above, consecutively. However, transmission intervals may better be longer, taking the battery life into consideration. Therefore, after a time period necessary for specifying the wheel position elapses, a wheel position establishing mode is switched to a periodical transmission mode. In such a manner, the frame transmission is carried out for every longer constant cycle (for example, for every 1 minute), so that a signal regarding the tire pressure is periodically transmitted to the TPMS-ECU 3. Here, by providing, for example, a random delay time with each of the transmitters 2, the transmission timings of each of the transmitters 2 may become different, which can prevent the TPMS-ECU 3 from failing in the reception due to interference of the radio waves from the plurality of the transmitters 2.

Figure 2B:
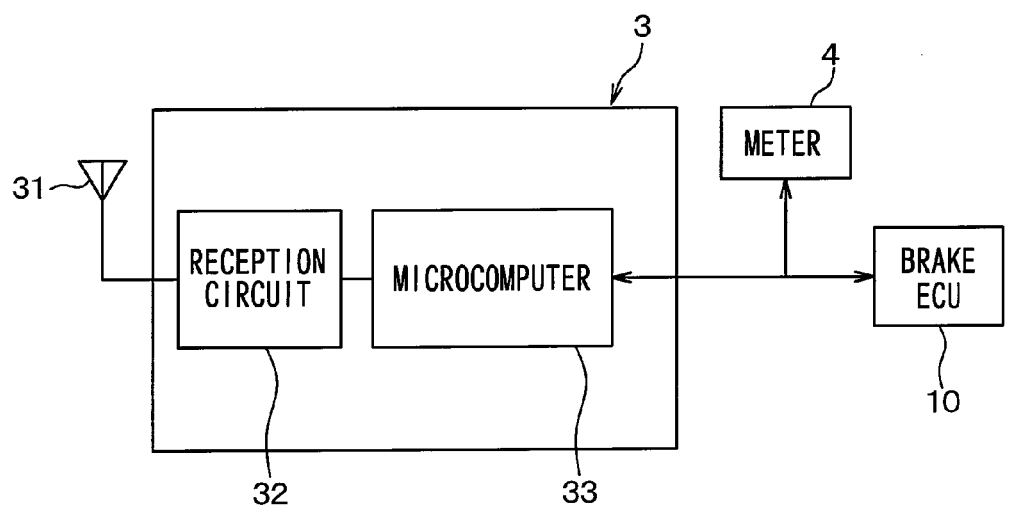
FIG. 2B is a block diagram illustrating a configuration of a TPMS-ECU.

In addition, the TPMS-ECU 3 is configured to have a reception antenna 31, a reception circuit 32, a microcomputer 33, and the like, as illustrated in FIG. 2B. The TPMS-ECU 3 acquires the gear information from the brake ECU 10 through an in-vehicle LAN such as a CAN, thereby to acquire a gear position indicated by the number of tooth edges (or the number of teeth) of a gear that rotates along with the corresponding wheels 5a-5d, as described later.

The reception antenna 31 receives the frame sent from each of the transmitters 2. The reception antenna 31, which is fixed to the vehicle body 6, may be an interior antenna disposed within a body of the TPMS-ECU 3, or an exterior antenna configured by drawing a wiring out from the body.

The reception circuit 32 serves as an input section that inputs the transmission frame, which is transmitted from each of the transmitters 2 and received by the reception antenna 31, and sends the frame to the microcomputer 33. Upon receiving the signal (frame) through the reception antenna 31, the reception circuit 32 conveys the received signal to the microcomputer 33.

The microcomputer 33, which corresponds to a second controlling section, carries out a wheel position detection process in accordance with a program stored in the memory within the microcomputer 33. Specifically, the microcomputer 33 carries out the wheel position detection in accordance with a relationship between the information acquired from the brake ECU 10 and the reception timing at which the transmission frame is received from each of the transmitters 2. From the brake ECU 10, the gear information of wheel speed sensors 11a-11d provided correspondingly in the wheels 5a-5d is acquired at predetermined intervals (for example, 10 milliseconds).

The gear information is information that indicates a gear position of the gear that rotates along with the corresponding one of the wheels 5a-5d. The wheel speed sensors 11a-11d are configured, for example, by electromagnetic pick-up type sensors that are disposed so as to oppose the gear teeth of the gear, and change detection signals with a transit of the gear teeth. Such types of the wheel speed sensors 11a-11d output a rectangular pulse in response to the teeth transit as a detection signal. Therefore, a rise and a fall of the rectangular pulse represent the transit of the edge of the gear teeth. Accordingly, in the brake ECU 10, the number of tooth edges, or the number of the edge transits of the gear, is counted from the number of the rises and the falls of the detection signals of the vehicle speed sensors 11a-11d, and the number of tooth edges at that time is conveyed as the gear information indicating the teeth position to the microcomputer 33 for every predetermined cycle. With this, the microcomputer 33 can perceive which one of the gear teeth transits at that timing.

The number of tooth edges is reset for every one rotation of the gear. For example, when the number of teeth provided in the gear is forty eight, the number of edges is counted from 0 to 95 to be a total of 96. When the counted value reaches 95, the value returns to zero and the counting is started.

Incidentally, while the number of tooth edges of the gear is conveyed as the gear information from the brake ECU 10 to the microcomputer 33, the number of teeth as a counted value of the number of transits of the teeth may be sufficient. In addition, the number of teeth or edges that transit in a predetermined cycle is conveyed to the microcomputer 33, and the number of teeth or edges that transit in the predetermined cycle is added to the previous number of teeth or edges by the microcomputer 33, so that the number of teeth or edges in the cycle may be counted. Namely, it may be sufficient that the number of teeth or edges in the cycle is finally acquired as the gear information by the microcomputer 33. Moreover, while the number of tooth edges (or the number of teeth) of the gear is reset in the brake ECU 10 every time the electric power is off, the measurement is restarted at the same time as when the electric power is on, or when a predetermined vehicle speed is reached after the electric power is on. In such a manner, even when the reset is made every time the electric power is off, the same teeth are expressed by the same number of edges (or the number of teeth) when the electric power is off.

The microcomputer 33 measures the reception timing when receiving the frame transmitted from each of the transmitters 2, and carries out the wheel position detection in accordance with the number of tooth edges (or the number of teeth) of the gear at the time of the reception timing of the frame among the number of tooth edges (or the number of teeth) of the gear, which has been acquired. In such a manner, the wheel position detection that specifies to which of the wheels 5a-5d each of the transmitters 2 is attached can be carried out based on the reception timing and the tooth position indicated by the gear information. A specific method of the wheel position detection is explained in detail later.

In addition, the microcomputer 33 stores the ID information of each of the transmitters 2 in association with the positions of the wheels 5a-5d to which the corresponding transmitters 2 are attached, based on the result of the wheel position detection. After that, the microcomputer 33 carries out the tire pressure detection for the wheels 5a-5d in accordance with the data regarding the tire pressure and the ID information stored in the transmission frame from each of the transmitters 2, and outputs an electrical signal depending on the tire pressure to the meter 4 through the in-vehicle LAN such as CAN. For example, the microcomputer 33 detects a reduction of the tire pressure by comparing the tire pressure with a predetermined threshold value Th. When the reduction of the tire pressure is detected, the microcomputer 33 outputs a signal indicating that effect to the meter 4. With this, the fact that the tire pressure of any one of the four wheels 5a-5d has been reduced is conveyed to the meter 4.

The meter 4, which functions as an alarming section, is disposed in a place visible to a driver, as illustrated in FIG. 1. The meter 4 is configured of a meter display or the like arranged, for example, within an instrument panel in the vehicle 1. The meter 4 notifies the driver of the reduction of the tire pressure of a specific wheel by displaying the reduction of the tire pressure, specifying the wheels 5a-5d, when receiving the signal indicating, for example, that the tire pressure is reduced from the microcomputer 33 in the TPMS-ECU 3.

Subsequently, an operation of the tire air pressure detection apparatus according to the present embodiment is explained. In the following, although the operation of the tire air pressure detection apparatus is explained, the tire pressure detection and the wheel position detection carried out in the tire air pressure detection apparatus are separately explained.

First, the wheel position detection is explained. At the beginning, a basic method of the wheel position detection where a road surface condition is not taken into consideration is explained with reference to FIG. 4 through FIG. 7D. As a case where the road surface condition is not taken into consideration, a case where the frame transmission is carried out when the angle of the transmitter 2 becomes the predetermined transmission angle and the frame is received by the receiver 3 thereby to carry out the wheel position detection is explained. Here, the transmission timing can be arbitrarily changed.

On the transmitter 2 side, the microcomputer 23 monitors the detection signal of the acceleration sensors 22 for every predetermined sampling cycle in accordance with the electric power supplied from the battery, and thus detects the vehicle speed and the angle of the transmitter 2 of the corresponding one of the wheels 5a-5d. When the vehicle speed reaches a predetermined speed, the microcomputer 23 carries out the frame transmission repeatedly at the transmission timings, which are the timings when the angle of the transmitter 2 becomes the transmission angle.

Namely, when the gravitational acceleration component of the detection signal of the acceleration sensor 22 is extracted, a sine curve as illustrated in FIG. 3A is obtained. Based on the sine curve, the angle of the transmitter 2 is found. Therefore, the fact that the transmitter 2 becomes the transmission angle is detected based on the sine curve, thereby to carry out the frame transmission.

On the other hand, on the TPMS-ECU 3 side, the gear information of the wheel speed sensors 11a-11d provided correspondingly in the wheels 5a-5d is acquired for every predetermined cycle (for example, 10 milliseconds) from the brake ECU 10. When receiving the frame transmitted from each of the transmitters 2, the TPMS-ECU 3 measures the reception timing, and acquires the number of edges (or the number of teeth) of the gear at the reception timing of the frame among the acquired number of edges (or the number of teeth) of the gear.

At this time, the reception timing of the frame transmitted from each of the transmitters 2 does not always correspond with a cycle during which the gear information is acquired from the brake ECU 10. Therefore, the number of edges (or the number of teeth) of the gear indicated by the gear information acquired in a cycle nearest to the reception timing of the frame, among the cycles during which the gear information is acquired from the brake ECU 10, is used as the number of edges (or the number of teeth) of the gear at the frame reception timing. The cycle nearest to the reception timing of the frame, mentioned here, may be either one of a cycle immediately before or immediately after the reception timing of the frame. In addition, by using the number of edges (or the number of teeth) of the gear, which is indicated by the gear information and acquired at the timing immediately before and immediately after the reception timing of the frame, among the cycles during which the gear information is acquired from the brake ECU 10, the number of edges (or the number of teeth) of the gear at the reception timing of the frame may be calculated. For example, a medium value of the number of edges (or the number of teeth) of the gear, which is indicated by the gear information and acquired at the timings immediately before and immediately after the reception timing of the frame, may be used as the number of edges (or the number of teeth) of the gear at the reception timing of the frame.

Such an operation of acquiring the number of edges (or the number of teeth) of the gear at the reception timing of the frame is repeated every time the frame is received, and the wheel position detection is carried out based on the acquired number of edges (or the number of teeth) of the gear at the reception timing of the frame. Specifically, the wheel position detection is carried out by determining whether or not variability in the numbers of edges (or the number of teeth) of the gear at the reception timing of the frame is within a predetermined range set based on the number of edges (or the number of teeth) of the gear at the previous reception timing.

Regarding the wheel for which the frame is received, the frame transmission is carried out from the transmitter 2 at the timing when the angle of the transmitter 2 becomes the transmission angle. Therefore, when it is presumed that the transmission angle is the same angle, the tooth position indicated by the number of edges (or the number of teeth) at the reception timing of the frame substantially corresponds with the previous one. Therefore, the variability in the number of edges (or the number of teeth) of the gear at the reception timing of the frame is small, and thus falls within the predetermined range. This holds true even when the frame is received plural times, and the variability in the number of edges (or the number of teeth) of the gear at the reception timing of each frame falls within the predetermined range determined at the reception timing of the first frame. On the other hand, regarding the wheel other than the wheel for which the frame is received, the teeth positions indicated by the number of edges (or the number of teeth) of the gears at the reception timing of the frames transmitted from the transmitters 2 of other wheels vary.

Namely, because the gears of the vehicle speed sensors 11a-11d rotate in connection with the corresponding wheels 5a-5d, regarding the wheel for which the frame is received, the teeth positions indicated by the number of edges (or the number of teeth) of the gear at the reception timing of the frame are substantially in agreement. However, because rotating states of the wheels 5a-5d may be varied by road surface condition, turn or lane changes, or the like, the rotating states of the wheels 5a-5d cannot be completely the same. Therefore, regarding the wheel other than the wheel for which the frame is received, the teeth positions indicated by the number of edges (or the number of teeth) of the gear at the reception timing of the frame vary.

Figure 5:
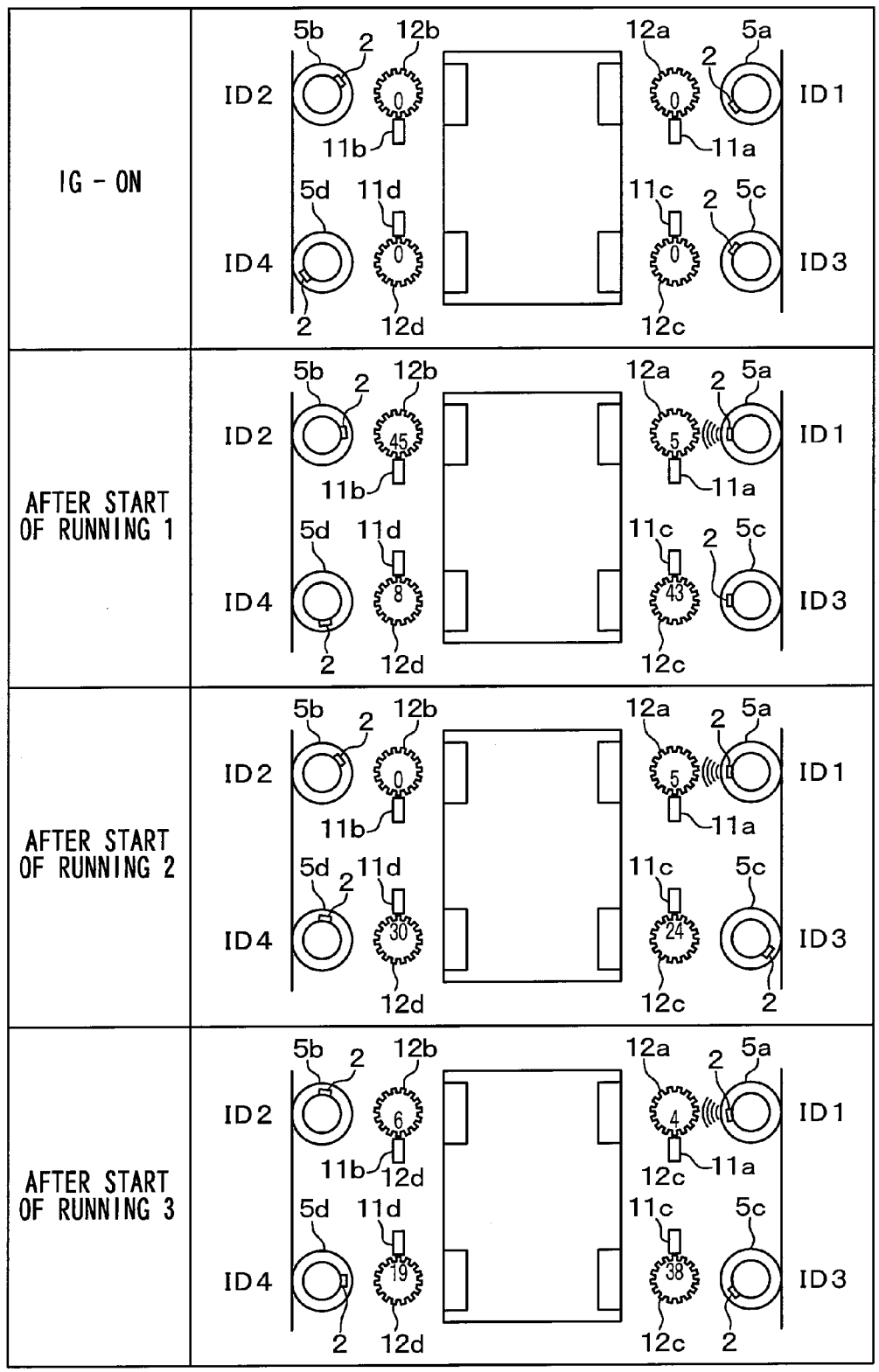
FIG. 5 is an image diagram illustrating changes of gear information.

Therefore, as illustrated in FIG. 5, regarding the wheel other than the wheel for which the frame is received, while the number of edges of the gears 12a-12d is zero at the very beginning when an ignition switch (IG) is on, the gear positions at the reception timings become gradually varied after the vehicle starts running. By determining whether or not the variations are within the predetermined range, the wheel position detection can be carried out.

Figure 6A:
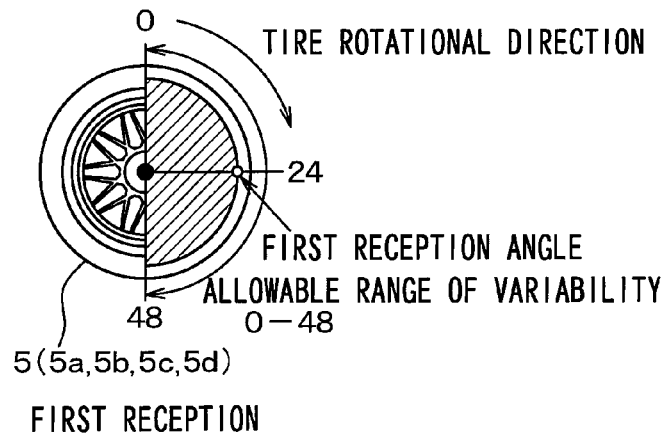
FIG. 6A is a view for explaining a wheel position confirming logic.
Figure 6B:
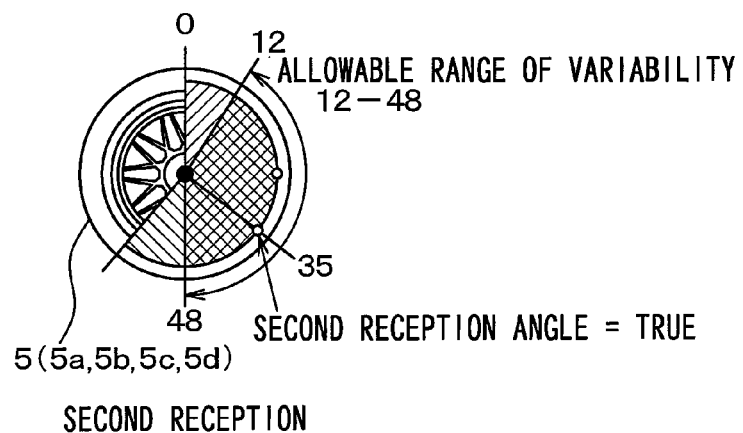
FIG. 6B is a view for explaining a wheel position confirming logic.

For example, as illustrated in FIG. 6A, it is presumed that the position of the transmitter 2 at the time of a first frame transmission is at a first reception angle. In addition, it is presumed that an allowable range of variability, which is a width in which the variability in the number of edges (or the number of teeth) is allowable, is a value corresponding to a range of 180 degrees centering the first reception angle (a range of the first reception angle ±90 degrees). When it comes to the number of edges, the range is presumed to be a range of the number of edges ±24 centering the number of edges at the time of the first reception. When it comes to the number of teeth, the range is presumed to be a range of the number of teeth ±12 centering the number of teeth at the time of the first reception. In this case, as illustrated in FIG. 6B, when the number of edges (or the number of teeth) at the time of a second reception is within the allowable range of variability determined by the first frame reception, the wheel may correspond with the wheel for which the frame transmission is carried out. In this case, the determining result is TRUE (correct).

However, even in this case, the allowable range of variability is determined centering the second reception angle, which is the angle of the transmitter 2 at the time of the second frame reception, and thus comes to have a value of 180 degrees (±90 degrees) centering the second reception angle. Therefore, an overlapping part of the allowable range of variability of 180 degrees (±90 degrees) centering the first reception angle, which is the previous allowable range, and the allowable range of variability of 180 degrees (±90 degrees) centering the second reception angle becomes a new allowable range of variability (a range of the number of edges is 12-48). The allowable range of variability can be narrowed to the overlapping range.

Figure 6C:
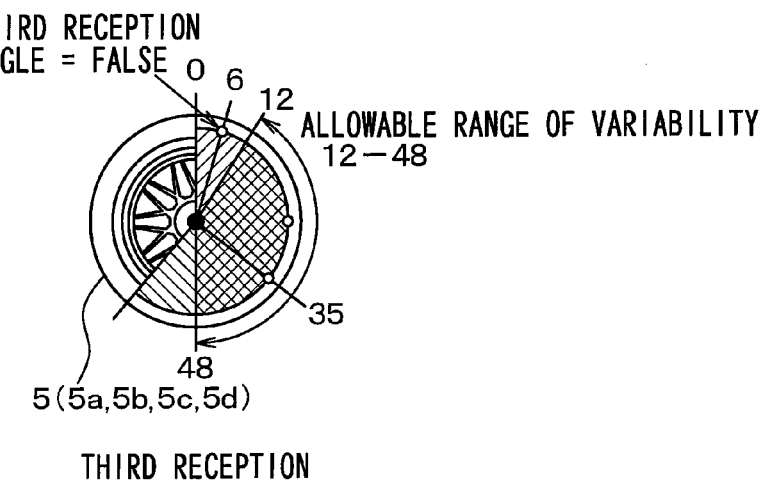
FIG. 6C is a view for explaining a wheel position confirming logic.

Therefore, as illustrated in FIG. 6C, when the number of edges (or the number of teeth) at the time of a third frame reception is outside the allowable range of variability determined by the first and the second frame receptions, the wheel does not correspond with the wheel for which the frame transmission is carried out. Accordingly, the determining result is FALSE (error). In this case, even if the number of edges (or the number of teeth) at the time of the third frame reception is within the allowable range of variability determined by the first frame reception, the result is determined to be FALSE when the number of edges (or the number of teeth) at the time of the third frame reception is outside the allowable range of variability determined by the first and the second frame receptions. In such a manner, it becomes feasible to specify which of the wheels 5a-5d has the transmitter 2, which has transmitted the received frame, attached thereto.

Namely, as illustrated in FIG. 7A, regarding the frame in which ID1 is included as the identification information, the number of edges (or the number of teeth) of the gear is acquired for every reception timing of the frame, and the number of edges (or the number of teeth) of the gear is stored for every one of the wheels (a front left wheel FL, a front right wheel FR, a rear left wheel RL, a rear right wheel RR). Every time when the frame is received, it is determined whether the acquired number of edges (or the number of teeth) of the gear is within the allowable range of variability, and the wheel determined outside the range is eliminated from candidates of the wheel to which the transmitter 2 that has transmitted the frame is attached. The wheel that finally remains not eliminated is registered as the wheel to which the transmitter 2 that has transmitted the frame is attached. In the case of the frame including the ID1, the front right wheel FR, the rear right wheel RR, and the rear left wheel RL are eliminated in sequence from the candidates, and the front left wheel FL that finally remains is registered as the wheel to which the transmitter 2 that has transmitted the frame is attached.

As illustrated in FIG. 7B through FIG. 7D, the same process as carried out for the frame including ID1 is carried out for the frames in which ID2 through ID4 are included as the identification information. With this, the wheels to which the transmitters 2 that have transmitted the corresponding frames are attached can be specified, so that it becomes feasible to specify all the four wheels to which the corresponding transmitters 2 are attached.

In such a manner, it is specified which one of the wheels 5a-5d each frame is attached to. Then, the microcomputer 33 stores the ID information of each of the transmitters 2 that have transmitted the frames in association with the position of the wheel to which the transmitter 2 is attached. With this, the wheel position detection can be carried out.

Incidentally, the TPMS-ECU 3 receives the frame that has been transmitted when the vehicle speed reaches a predetermined speed, and stores the gear information at the reception timing. However, when the vehicle speed becomes a predetermined running halt determining speed (for example, 5 km/h) or less, the preceding gear information is discarded. Then, when the vehicle starts running again, the wheel position detection is carried out anew in the above manner.

By the above method, the wheel position detection can be carried out. However, the accuracy of the angle detection for the transmitter 2 in accordance with the detection signal of the acceleration sensor 22 varies depending on the road surface condition. For example, the accuracy becomes higher on a road surface that has smaller roughness and thus is not rough, such as a paved road, but the accuracy becomes deteriorated on a road surface that has larger roughness and thus is rough, such as a gravel road. In response to this, when the wheel position detection is carried out in accordance with the method such as above and the allowable range of variability is set to be a narrow range conformably with the road surface that is not rough, the wheel position detection cannot be carried out at the time of running on the rough road surface. On the contrary, there is a concern in that the wheel position detection at the time of running on the road surface that is not rough takes a longer time when the allowable range of variability is set to be a wider range conformably with the road surface that is rough.

Figure 8A:
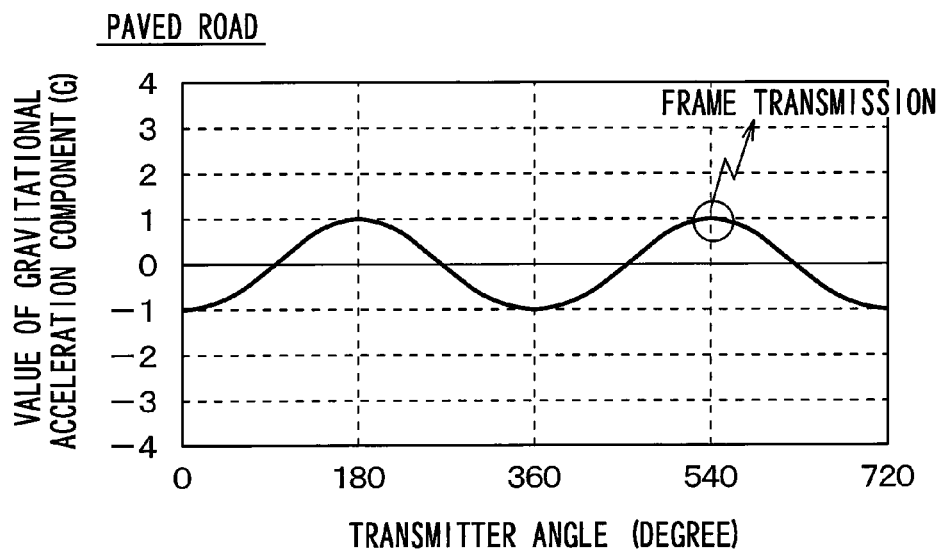
FIG. 8A is a waveform diagram illustrating changes of the value of the gravitational acceleration component included in the detection signal of the acceleration sensor at the time of running on a road surface that is not rough, such as a paved road.

Then, in the present embodiment, the allowable range of variability can be set depending on the road surface condition. Specifically, the detection signal of the acceleration sensor 22 has less noise components on the road surface that is not rough, such as a paved road, and is extracted as a clear sine curve that is less distorted in data of ±1 G when the gravitational acceleration component is extracted as illustrated in FIG. 8A. Therefore, because there is less influence due to noises on the road surface that is not rough, the accuracy of the angle detection of the transmitter 2 becomes higher, so that variability of the frame transmission timings becomes narrow. For example, when the position of the positive maximum amplitude in the sine curve is set to be the transmission angle, the angle of the transmitter 2 can be accurately detected, so that the frame transmission is adequately carried out at the position. Therefore, even when the allowable range of variability is set narrower, the adequate wheel position detection can be carried out.

Figure 8B:
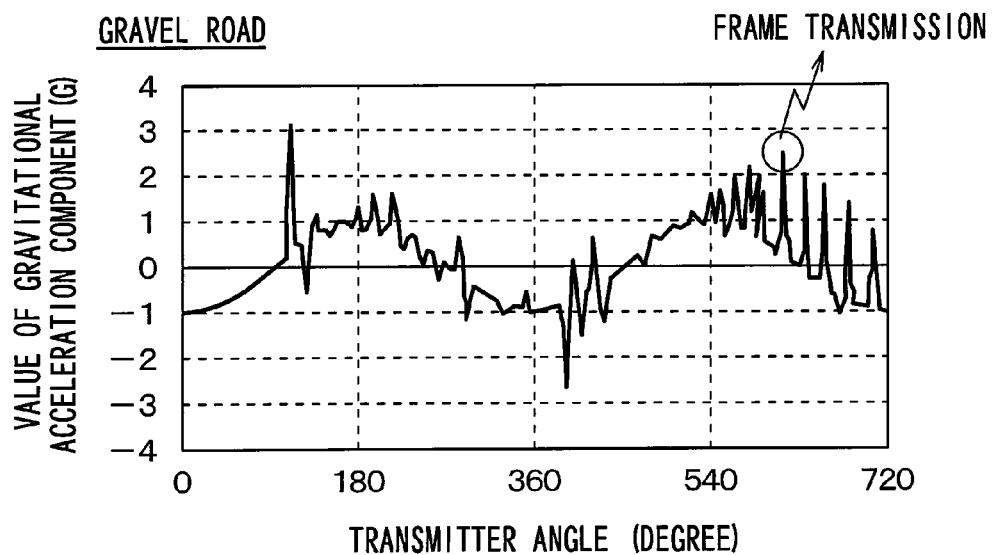
FIG. 8B is a waveform diagram illustrating changes of the value of the gravitational acceleration component included in the detection signal of the acceleration sensor at the time of running on a road surface that is rough, such as a gravel road.

On the contrary, impacts that act on the tires due to the roughness of the road surface causes noise components in the case of the road surface that is rough, such as the gravel road. When the gravitational acceleration component is extracted, the noises are superposed onto the data of ±1 G as illustrated in FIG. 8B, so that a clear sine curve is not obtained. Therefore, because the influence due to the noises is greater in the case of the road surface that is rough, the accuracy of the angle detection of the transmitter 2 becomes lower, so that the variability of the frame transmission timings become greater. For example, when the position of the positive maximum amplitude in the sine curve is set to be the transmission angle, the angle of the transmitter 2 cannot be accurately detected, so that the frame transmission is not adequately carried out at the position. Therefore, there may be possibility that the wheel position detection cannot be adequately carried out when the allowable range of variability is not set wider.

Therefore, the allowable range of variability is set narrower for the road surface that is not rough, and the allowable range of variability is set wider for the road surface that is rough. With this, because the wheel position detection can be carried out based on the narrower allowable range of variability at the time of running on the road surface that is not rough, the wheel position detection can be carried out faster. In addition, the wheel position detection is carried out based on the wider allowable range of variability at the time of running on the road surface that is rough, the wheel position detection can be carried out adequately even in the case of the road surface that is rough.

Figure 9A:
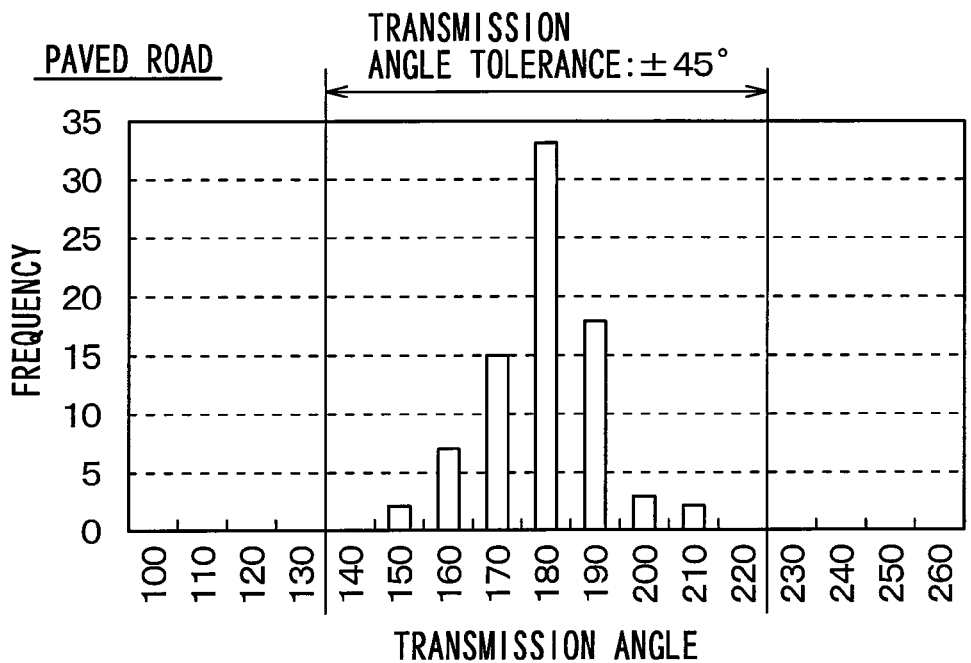
FIG. 9A illustrates an investigation result of variability of the transmitter angle at the time of transmission when a frame transmission is carried out on the paved road.
Figure 9B:
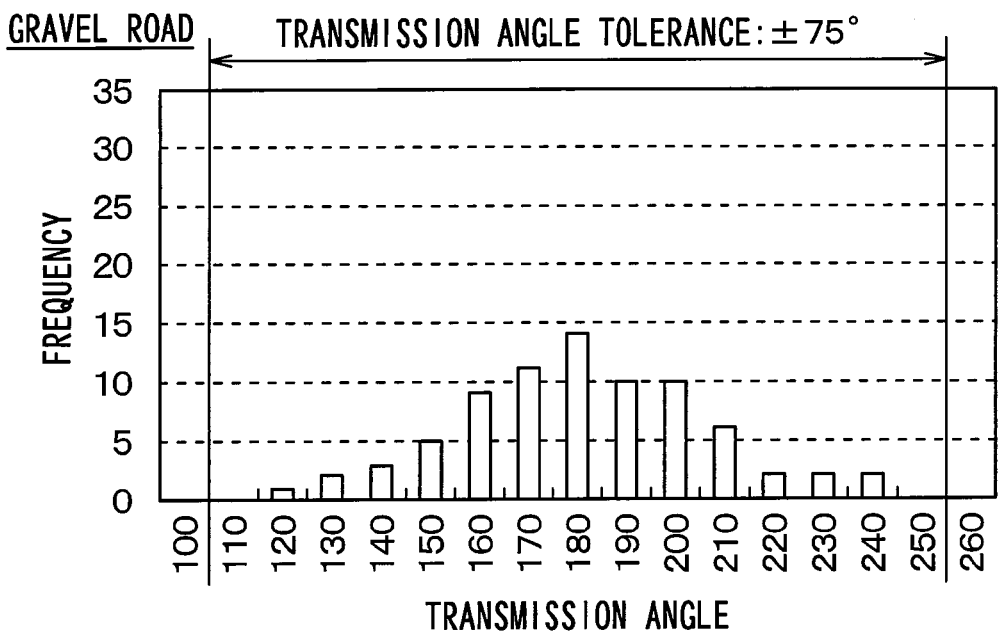
FIG. 9B illustrates an investigation result of variability of the transmitter angle at the time of transmission when the frame transmission is carried out on the gravel road.

For example, in order to set an appropriate allowable range of variability regarding the paved road as the road surface that is not rough, the angle of the transmitter 2 (namely, the transmission angle) and the frequency when the frame transmission is carried out on the paved road are investigated. Similarly, in order to set an adequate allowable range of variability regarding the gravel road as the road surface that is rough, the angle of the transmitter 2 (namely, the transmission angle) and the frequency when the frame transmission is carried out on the gravel road are investigated. Specifically, the frame transmission is carried out plural times under presumption that the position at the positive maximum amplitude of the sine curve is the transmission angle (180 degrees is exemplified here, for example), and the angle of the transmitter 2 when the frame transmission is actually carried out is investigated. As a result, as illustrated in FIG. 9A, the frame transmissions are carried out within a range of a tolerance of ±45 degrees centering on the 180 degrees in the case of the paved road, and as illustrated in FIG. 9B, the frame transmissions are carried out within a range of a tolerance of ±75 degrees centering on the 180 degrees in the case of the gravel road. Therefore, the allowable range of variability can be set to be, for example, a transmission angle of ±45 degrees, in the case of the road surface that is not rough, and the allowable range of variability can be set to be, for example, a transmission angle of ±75 degrees, in the case of the road surface that is rough.

Specifically, in the present embodiment, the road surface condition detection is carried out on the transmitter 2 side. When a data transmission process illustrated in a flowchart of FIG. 10 is carried out thereby to carry out the frame transmission, the road surface condition is simultaneously detected, and the frame is transmitted with data regarding the road surface condition included therein. The data transmission process is carried out for every predetermined controlling period in the microcomputer 23 of the transmitter 2.

First, it is determined at S100 whether or not the vehicle is running. Regarding the fact that the vehicle is running is determined based on a result of the vehicle speed detection. When the vehicle speed becomes a predetermined speed (for example, 5 km/h) or more, it is determined that the vehicle 1 is running. When determined running, the procedure proceeds to S110.

The angle of the transmitter 2 is detected, and the road surface condition is also detected, at S110. The angle of the transmitter 2 is detected based on the detection signal of the acceleration sensor 22. Because a value of the gravitational acceleration component of the detection signal of the acceleration sensor 22 draws a sine curve, the angle of the transmitter 2 is detected based on where to be positioned in the sine curve at that timing. The road surface condition is detected also based on the detection signal of the acceleration sensor 22. While the gravitational acceleration component included in the detection signal of the acceleration sensor 22 basically draws a sine curve, noises are superposed onto the sine curve depending on the road surface condition. Therefore, a difference ΔG between the maximum value and the minimum value of the value of the gravitational acceleration component onto which the noises are superposed is calculated. Then, based on whether or not this difference ΔG exceeds a predetermined threshold value (for example, 5 G), the road surface that is rough or the road surface that is not rough is determined. For example, as illustrated in FIG. 11, in the case of the road surface that is rough, such as a gravel road, the difference ΔG between the maximum value and the minimum value of the gravitational acceleration component becomes larger, because of the noises superposed thereto, so that the difference ΔG exceeds the threshold. Therefore, by comparing the difference ΔG between the maximum value and the minimum value of the gravitational acceleration component onto which the noises are superposed with the threshold value, the road surface condition can be detected.

After this, the procedure proceeds to S120, the frame transmission is carried out when the predetermined transmission timing comes, or at the timing when the angle of the transmitter 2 becomes, for example, the threshold transmission angle. In this case, the detection result is included in the frame so that the detection result of the road surface condition by the transmitter 2 can be recognized on the TPMS-ECU 3 side. For example, as with a frame configuration diagram illustrated in FIG. 12, angular accuracy information that indicates the accuracy of the angle of the transmitter 2 that varies depending on the road surface condition, namely, information that indicates the road surface condition is included, in addition to the ID information and air pressure and temperature information.

When the data transmission process is completed in such a manner and the frame including various data is transmitted, the frame is received by the TPMS-ECU 3 side, and the wheel position detection is carried out in accordance with the above-described method. At this time, the allowable range of variability is set depending on the road surface condition by the TPMS-ECU 3. Specifically, the TPMS-ECU 3 set the allowable range of variability in accordance with the detection result of the road surface condition by the transmitter 2, which is indicated by the angular accuracy information included in the frame. Namely, TPMS-ECU 3 sets the allowable range of variability to be a range of the reception angle ±45 degrees at the time of the frame reception in the case of the detection result of the road surface being not rough, or to be a range of the reception angle ±75 degrees at the time of the frame reception in the case of the detection result of the road surface being rough. With this, the wheel position detection can be carried out based on the allowable range of variability depending on the road surface condition.

After the wheel position detection is carried out in such a manner, the tire pressure detection is carried out. Specifically, at the time of the tire pressure detection, the frame is transmitted from each of the transmitters 2 for every constant cycle. Every time the frame is transmitted from each of the transmitters 2, the frames corresponding to the four wheels are received by the TPMS-ECU 3. Then, the TPMS-ECU 3 specifies from which of the transmitters 2 attached in the corresponding wheels 5*a*-5*d* the frames are transmitted, in accordance with the ID information stored in each of the frames. Then, the tire pressure of each of the wheels 5*a*-5*d* is detected from the information regarding the tire pressure. With this, a reduced tire pressure in each of the wheels 5*a*-5*d* can be detected, and thus it becomes feasible to specify in which of the wheels 5*a*-5*d* the tire pressure is reduced. When a reduced tire pressure is detected, the fact is conveyed to the meter 4, so that display is made that indicates the reduced tire pressure, specifying the wheels 5*a*-5*d*, by the meter 4, thereby to notify the driver of the reduced tire pressure in a specified wheel.

As explained in the foregoing, the allowable range of variability when the wheel position detection is carried out is set depending on the road surface condition in the present embodiment. Specifically, in the case of the road surface that is not rough the allowable range of variability is set narrower, and in the case of the road surface that is rough the allowable range of variability is set wider. With this, the wheel position detection is carried out with a narrower allowable range of variability when running on the road surface that is not rough, so that the wheel position detection can be carried out faster. In addition, the wheel position detection is carried out with a wider allowable range of variability when running on the road surface that is rough, so that the wheel position detection can be carried out adequately even in the case of the rough road surface. Therefore, the fast wheel position detection can be carried out on the road surface that is not rough, and the adequate wheel position detection can be carried out on the road surface that is rough.

Moreover, the overlapping part of the allowable range of variability, which is set in accordance with the tooth position at the reception timing of the frame, and the allowable range of variability, which is set at the reception timing of the last frame, is set as the new the allowable range of variability. Therefore, the new allowable range of variability can be narrowed to the overlapping range. Accordingly, the wheel position detection apparatus can be obtained which can accurately specify the wheel positions in a shorter period of time.

In addition, the wheel position detection can be carried out only after the vehicle 1 starts running, because the position detection of the transmitters 2 of the corresponding wheels 5*a*-5*d* is carried out using the acceleration sensors 22, and the fact that the vehicle speed becomes a predetermined speed or more is used as a frame transmission condition. However, it is immediately after starting running that the wheel position detection comes to be carried out. Moreover, differently from a case where the wheel position detection is carried out based on a reception intensity or the like of a signal output from a trigger device, the wheel position detection can be carried out without the necessity of the trigger device or the like.

Other Embodiments

The road surface condition may be detected on the TPMS-ECU 3 side, although detected on the transmitter 2 side in the above embodiment. For example, the road surface condition can be detected based on the detection signals of the wheel speed sensors 11*a*-11*d*. Specifically, a frequency analysis is carried out for the detection signals of the wheel speed sensors 11*a*-11*d*, thereby to extract a resonance frequency component that is determined by vibration characteristics of bushes in a front-rear direction of a suspension, so that the road surface condition can be detected from a vibration gain of this resonance frequency (for example, JP-A-H9-243345).

In addition, although the road surface condition is set at two levels, that is the road surface whose roughness is large and severe, and the road surface whose roughness is small and not severe in the above embodiments, stepwise levels of more than two may be set, so that the allowable range of variability may be set in accordance with the levels. In addition, the allowable range of variability, which has been presented in the above embodiments as merely an example, may be arbitrarily changed depending on a size of the tires and a type of the vehicle.

In addition, regarding the angle at which the frame transmission is carried out, when the acceleration sensor 22 is positioned in the upper position, it is this position that is set as a position at which the angle is zero degree centering the central axis of the corresponding one of the wheels 5*a*-5*d* in the above embodiments. However, this is merely an example. An arbitrary position along a circumferential direction may be set as the zero degree.

In addition, in the above embodiments, the allowable range of variability is changed every time the frame is received, so that the allowable range of variability is gradually narrowed. However, the allowable range of variability set based on the tooth position is set as a constant value corresponding to the road surface condition. The allowable range of variability set based on the teeth position may be further changed based on a factor other than the road surface condition. For example, variability of the teeth position may become greater, as the vehicle speed is increased. Therefore, by making the allowable range of variability greater as the vehicle speed is increased, a more adequate allowable range of variability can be set. In addition, as the sampling cycle at the time of carrying out the acceleration detection by the acceleration sensor 22 is longer, the detection accuracy of the angle of the transmitter 2 is reduced. Thus, by changing the allowable range of variability in accordance with the cycle, a more adequate allowable range of variability can be set. In this case, because the sampling cycle or the like is comprehended on the transmitter 2 side, data that determines a magnitude of the allowable range of variability may be included in the frame transmitted by the transmitter 2.

In the above embodiments, the TPMS-ECU 3 acquires the gear information from the brake ECU 10. However, it is sufficient if the TPMS-ECU 3 can acquire the number of tooth edges or the number of teeth of the gear as the gear information. Therefore, the number of tooth edges or the number of teeth of the gear may be acquired from other ECUs. Otherwise, the detection signals of the wheel speed sensors 11a-11d are input, and thus the number of tooth edges or the number of teeth of the gear may be acquired from the detection signals. Especially, although a case where the TPMS-ECU 3 and the brake ECU 10 are configured as separate ECUs is explained in the above embodiments, these may be configured by an integrated single ECU. In this case, this ECU directly inputs the detection signals of the wheel speed sensors 11a-11d and acquires the number of tooth edges or the number of teeth of the gear from the detection signals. In addition, in this case, because the number of tooth edges or the number of teeth of the gear can be constantly acquired, the wheel position detection can be carried out based on the gear information exactly at the frame reception timing, which is different from a case where the information is acquired at predetermined intervals.

Although an explanation has been made about the wheel position detection apparatus provided in the vehicle 1 provided with the four wheels 5a-5d in the above embodiments, the present disclosure is applicable in substantially the same manner to a vehicle with the larger number of wheels.

Incidentally, it is sufficient if the transits of the teeth of the gear that rotates in connection with the rotation of the wheels 5a-5d can be detected by the wheel speed sensors 11a-11d, in the present disclosure. Therefore, the gear may have a structure where tooth portions whose circumferential surfaces are electrically conductive and portions positioned between the teeth are alternatively repeated with each other so that magnetic resistances are different. Namely, not only a generic gear configured of convex portions whose circumferential surfaces are electrically conductive and spaces that are not electrically conductive, by making the outer peripheral portion thereof be in the form of convex-concave, but also, for example, a rotary switch or the like whose circumferential surface is configured of a portion that is electrically conductive and another portion that is electrically insulating is included (see, JP-A-H10-048233).

What is claimed is:

1. A wheel position detection apparatus applied to a vehicle in which a plurality of wheels provided with tires are attached to a vehicle body, the wheel position detection apparatus comprising:
    transmitters, each of which is provided in a corresponding one of the plurality of the wheels, and has a first controlling section that produces and transmits a frame including specific identification information;
    a receiver that is provided in the vehicle body and has a second controlling section, the second controlling section receiving the frame transmitted from each of the transmitters through a reception antenna and carrying out a wheel position detection to specify which wheel the transmitter that has transmitted the frame is provided in, and to store the plurality of the wheels in association with the identification information of the transmitters provided in the plurality of the wheels, respectively,
    wherein each of the transmitters includes an acceleration sensor that outputs a detection signal depending on an acceleration including a gravitational acceleration component that varies in connection with rotation of the wheels in which the corresponding transmitters are provided,
    wherein each of the first controlling sections detects an angle of the corresponding one of the transmitters in accordance with the gravitational acceleration component included in the detection signal of the corresponding one of the acceleration sensors, with a central axis of the corresponding one of the wheels set as a center and with an arbitrary position along a circumferential direction set as zero degree, and transmits the frame repeatedly at a timing when the angle becomes a predetermined angle,
    wherein the second controlling section acquires gear information indicating tooth positions of gears in accordance with detection signals of wheel speed sensors that output the detection signals depending on transits of teeth of the gears that are rotated in connection with the plurality of the wheels, and sets an allowable range of variability in accordance with the tooth position at the reception timing of the frame, when the tooth position at the reception timing of the frame after the allowable range of variability is set is beyond the allowable range of variability, the corresponding one of the wheels is eliminated from candidates of the wheel to which the transmitter that has transmitted the frame is attached, and the remaining of the wheels is registered as a wheel to which the transmitter that has transmitted the frame is attached,
    wherein the second controlling section changes the allowable range of variability depending on a road surface condition indicated by roughness of a road surface every time the frame is received, so that the allowable range of variability is set wider for a road surface that is rough than for a road surface that is not rough, and
    wherein the second controlling section changes the allowable range of variability every time the frame is received, and sets an overlapping part of the allowable range of variability set in accordance with the tooth position at the reception timing of the frame and the allowable range of variability set at the reception timing of the last frame as a new allowable range of variability.

2. The wheel position detection apparatus according to claim 1,
    wherein the first controlling section detects the road surface condition in accordance with the detection signal of the acceleration sensor and transmits the frame including a detection result of the road surface, and
    wherein the second controlling section sets the allowable range of variability in accordance with the detection result of the road surface condition included in the frame.

3. The wheel position detection apparatus according to claim 2,
    wherein the first controlling section extracts the gravitational acceleration component onto which noises are superposed from the detection signal of the acceleration sensor, calculates a difference between a maximum value and a minimum value in the values of the gravitational acceleration component onto which the noises are superposed, and determines that the road surface condition is rough when the difference exceeds a predetermined threshold value and that the road surface condition is not rough when the difference does not exceed the predetermined threshold value.

4. A tire air pressure detection apparatus provided with the wheel position detection apparatus according to claim 1,
   wherein each of the transmitters includes a sensing section that outputs a detection signal depending on a pressure of the tire provided in each of the plurality of the wheels, and transmits the frame to the receiver after storing information regarding the pressure of the tire for which the detection signal from the sensing section is signal-processed by the first controlling section in the frame, and
   wherein the receiver detects the pressure of the tire provided in the corresponding one of the plurality of the wheels from the information regarding the pressure of the tire in the second controlling section.

* * * * *